United States Patent
Swinderman

(10) Patent No.: US 7,779,987 B2
(45) Date of Patent: Aug. 24, 2010

(54) DEVICE FOR AND METHOD OF SAMPLING THE AMOUNT OF CARRYBACK MATERIAL TRANSFERRED BY A BULK MATERIAL BELT CONVEYOR SYSTEM

(75) Inventor: Robert Todd Swinderman, Palm Coast, FL (US)

(73) Assignee: Martin Engineering Company, Neponset, IL (US)

( * ) Notice: Subject to any disclaimer, the term of this patent is extended or adjusted under 35 U.S.C. 154(b) by 225 days.

(21) Appl. No.: 12/133,144

(22) Filed: Jun. 4, 2008

(65) Prior Publication Data

US 2009/0301844 A1     Dec. 10, 2009

(51) Int. Cl.
B65G 15/02        (2006.01)
(52) U.S. Cl. ............ 198/497; 73/863.52; 73/863.91
(58) Field of Classification Search ......... 198/497–499; 73/863.52–863.55, 863.91
See application file for complete search history.

(56) References Cited

U.S. PATENT DOCUMENTS

| | | | | |
|---|---|---|---|---|
| 4,098,394 A | * | 7/1978 | Stahura | 198/499 |
| 4,611,498 A | * | 9/1986 | Stahura | 73/864.41 |
| 4,917,231 A | * | 4/1990 | Swinderman | 198/497 |
| 5,121,829 A | * | 6/1992 | Grannes et al. | 198/495 |
| 5,223,128 A | * | 6/1993 | Combrowski | 210/138 |
| 5,355,992 A | * | 10/1994 | Baig et al. | 198/495 |
| 5,657,853 A | * | 8/1997 | Pennino | 198/499 |
| 5,799,776 A | * | 9/1998 | Dolan | 198/499 |
| 6,986,418 B2 | * | 1/2006 | Swinderman et al. | 198/497 |
| 2001/0054539 A1 | * | 12/2001 | Swinderman | 198/499 |

* cited by examiner

*Primary Examiner*—Mark A Deuble
(74) *Attorney, Agent, or Firm*—Thompson Coburn LLP; Clyde L. Smith

(57) ABSTRACT

An assembly comprises a bulk material belt conveyor system and a carryback sampling device. The bulk material belt conveyor system comprises a belt and a structural frame. The belt is supported by the structural frame and has a downwardly facing portion. The belt is configured to traverse relative to the structural frame. The carryback sampling device comprises at least a first support member, a carryback receptacle, and a carryback scraper. The first support member is pivotally attached to the structural frame about an axis. The carryback scraper and the carryback receptacle are attached to the structural frame via the first support member in a manner such that pivotal movement of the first support member about the axis relative to the structural frame brings the carryback scraper into engagement with the downwardly facing portion of the belt with the carryback receptacle positioned therebeneath.

14 Claims, 6 Drawing Sheets

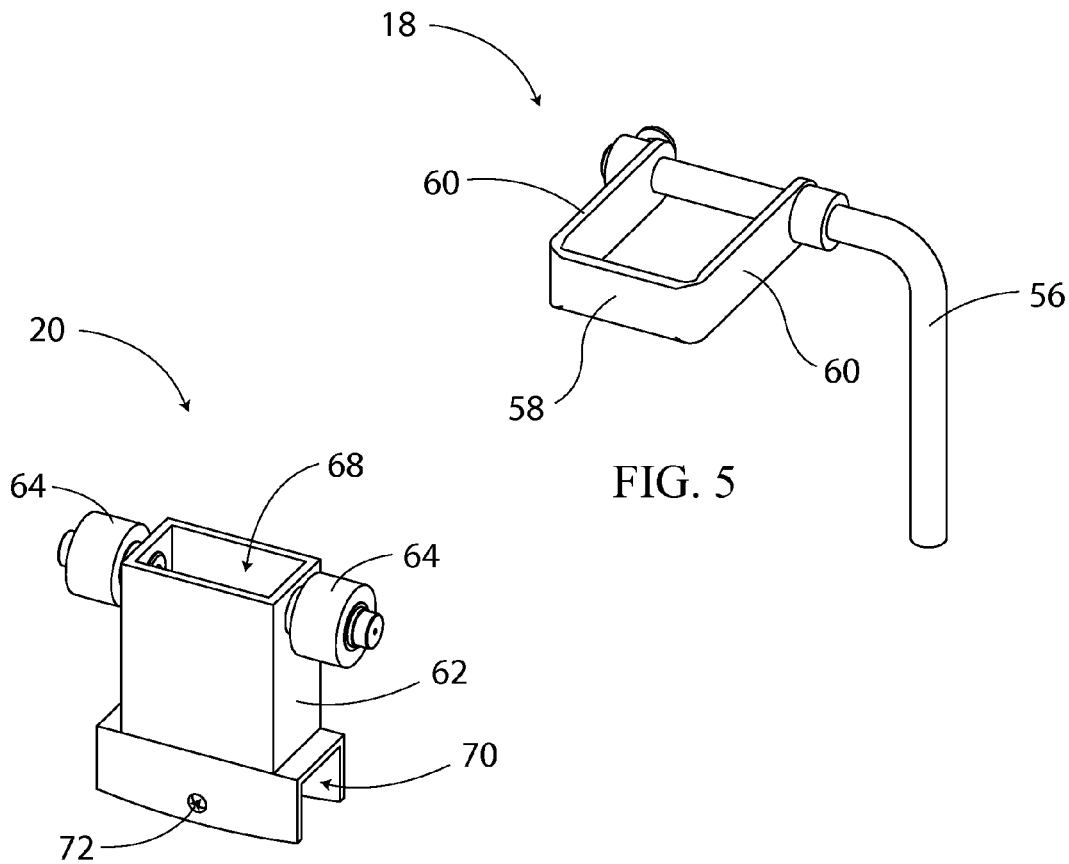
FIG. 5
FIG. 6
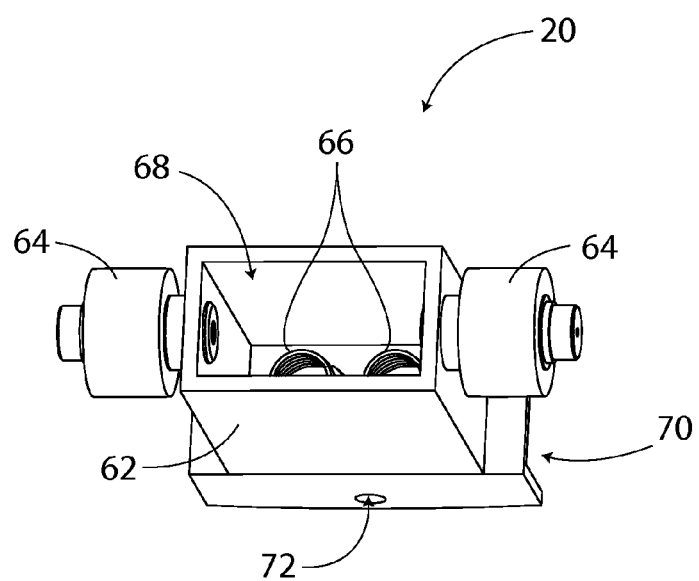
FIG. 7

DEVICE FOR AND METHOD OF SAMPLING THE AMOUNT OF CARRYBACK MATERIAL TRANSFERRED BY A BULK MATERIAL BELT CONVEYOR SYSTEM

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to bulk material belt conveyor systems. More particularly, this invention pertains to an apparatus and method of estimating the amount of carryback material that is transferred by the belt of such a conveyor system.

2. General Background Technology

Bulk material belt conveyor systems are utilized to transfer bulk materials from a location near the tail of the conveyor system to a location at the head of the conveyor system. Invariably, some bulk material transferred by the belt of a conveyor system sticks or adheres to belt rather than being dump from the belt at the head of the conveyor system and travels back toward the tail of the conveyor system. Such bulk material is referred to in the art as carryback material. Some conveyor systems include belt scrapers and/or water jets for the purpose of dislodging such carryback material. Such devices are typically positioned at or near where the belt begins its return path from the head portion to the tail portion of the conveyor system. However, even with the use of belt scrapers and/or water jets, typically not all of the carryback material can be removed from the belt. The amount of carryback material that remain on a belt varies with such things as the moisture content of the bulk material, the physical properties of the bulk material, the temperature, and the condition of the belt and scrapers.

In some cases, it is desirable or even a requirement to estimate the amount of carryback material being transferred by the belt of a conveyor system. Such an estimate is often performed by temporarily engaging the return side of the belt with a carryback scraper for a duration of time and collecting the amount of carryback material removed by the scraper for measurement. In most cases, the amount of carryback material is dried using heat or a partial vacuum and then weighed. The width of carryback scrapper, the speed of the belt, the duration of time, and the mass of the dried carryback martial is then used to approximate such things as the mass of carryback material per area of belt or the mass of carryback material transferred by the belt per unit time. Typically the approximation is given in units of grams per square meter of belt surface in contact with the bulk material.

Different devices exist for estimating the amount of carryback material being transferred by the belt of a conveyor system. One such device developed by Hosch Fordertechnik GmbH (HOSCH) uses a carryback sampling device that comprises a carryback scraper mounted on a shaft that extends across the width of the conveyor beneath the belt. The scraper is attached to the shaft and, with the belt operating, the shaft is rotated to point where the carryback scraper makes contact with the downwardly facing surface of the belt. A bucket is also supported by the shaft and is positioned beneath the carryback scraper. As this occurs, carryback material is removed from the belt via the carryback scraper and falls into the bucket. After this occurs for a period of time, the belt operation is stopped and the bucket, along with its contents of carryback material are removed from under the belt. The carryback material is then typically dried and weighed (usually offsite), and a determination of the amount of carryback transferred by the belt is determined based on the weight of the measure carryback material. A drawback of this device is that the belt must be stopped in order to install the scraper and the bucket and to recover a carryback sample and reset the device to take additional samples. This reduces the productivity of the conveyor system. Another drawback of the HOSCH device is that the pressure exerted by the carryback scraper against the belt is dependent on the elevation of the shaft and the condition of or wear on the carryback scraper, which inherently change from one test to the next. Thus, the HOSCH device does not provide a consistent means of measuring the carryback material transferred by a conveyor system.

Another device for sampling carryback material known in the industry is the ICT Automated Carryback Monitor (ICT) developed by the University of Newcastle and used by several companies such as ESS Engineering Services and Supplies in Corrumbin, Australia. The ICT device comprises a shaft extending across the width of a conveyor beneath the belt. The shaft is supported from the support frame of the conveyor system via actuators that are configured to pneumatically or hydraulically raise the shaft from a lowered position to a raised position relative to the belt. A carryback material receptacle is mounted on shaft as are a plurality of carryback scrapers that extend upward. The ICT device also comprises a motor and chain system that is configured to reciprocate the carryback receptacle and the carryback scrapers back and forth along the shaft. In operation, the ICT device raises the shaft into the raised position, where the carryback scrapers engage the downward facing surface of the belt, and reciprocates the carryback receptacle and the carryback scrapers back and forth along the shaft for a specific time while the belt is operating. During such time, carryback material is scraped from the belt in a serpentine pattern via the carryback scrapers and deposited into the carryback material receptacle. The reciprocation of the carryback scrapers and the carryback material receptacle along the shaft is performed to yield an accurate reflection of the average carryback material across the width of the belt. After the specific amount of time has passed, the shaft is automatically lowered, thereby disengaging the carryback scrapers from the belt, and the motor and chain drive the carryback material receptacle out from under the belt to one side of shaft for removal. As was the case with using the HOSCH device, the carryback material collected by the ICT device is typically dried and weighed. The ICT device is configured to obtain relatively accurate measurements of carryback material. However, the ICT device requires external power (electricity and pressurized air or oil). Moreover, although the belt does not need to be stopped in order to use the ICT carryback sampling device, the belt does have to be stopped in order to assemble The ICT carryback sampling device to a conveyor system. Additionally, the accuracy of measurements obtained by the ICT carryback sampling device is dependent upon the precise alignment of the carryback scrapers relative to their mounting in the carryback material receptacle, which is difficult to achieve.

SUMMARY OF THE INVENTION

The present invention is directed to a device and method for sampling the amount of carryback being transferred by a conveyor belt system. The present invention overcomes many of the disadvantages associated with prior art carryback sampling devices and techniques.

One aspect of the invention pertains to a method of sampling carryback material transferred by a bulk material belt conveyor system. The belt conveyor system comprises a belt, a structural frame, and a carryback sampling device. The belt is supported by the structural frame and on the return run has a downwardly facing portion that has carryback material attached thereto. The carryback sampling device comprises at least a first bracket, first and second support members, a carryback receptacle, and a carryback scraper. The first support member is pivotally attached to the first bracket in a manner such that first support member is pivotally movable relative to and beneath the downwardly facing portion of the belt. The second support member is slideably attached to the first support member. The method comprises a step of attaching the carryback receptacle to the second support member of the carryback sampling device while the belt is in motion relative to the structural frame. The method also comprises moving the second support member relative to the first support member in a manner positioning the carryback receptacle under the downwardly facing portion of the belt while the belt is in motion relative to the structural frame. Furthermore, the method comprises pivotally moving the first and second support members relative to the first bracket while the belt is in motion relative to the structural frame into a position that causes the carryback scraper to scrape the belt and to transfer a portion of the carryback material to the carryback receptacle. Still further, the method comprises removing the carryback receptacle together with the portion of the carryback material from beneath the belt while the belt is in motion relative to the structural frame by sliding the second support member relative to the first support member.

In another aspect of the invention, an assembly comprises a bulk material belt conveyor system and a carryback sampling device. The bulk material belt conveyor system comprises a belt and a structural frame. The belt is supported by the structural frame and has a downwardly facing portion. The downwardly facing portion of the belt is configured to traverse in a first direction relative to the structural frame. The carryback sampling device comprises at least a first support member, a carryback receptacle, and a carryback scraper. The first support member is pivotally attached to the structural frame about an axis. The carryback scraper and the carryback receptacle are attached to the structural frame via the first support member in a manner such that pivotal movement of the first support member about the axis relative to the structural frame brings the carryback scraper into engagement with the downwardly facing portion of the belt with the carryback receptacle positioned therebeneath.

Yet another aspect of the invention pertains to a method of estimating the amount of carryback material transferred by a belt of a bulk material conveyor system. The method comprises engaging a carryback scraper against the belt for a duration of time while the belt is in motion relative to the carryback scraper in a manner such that the carryback scraper removes carryback material from the belt. The method also comprises, depositing carryback material removed from the belt by the carryback scraper into a carryback receptacle. Furthermore, the method comprises estimating an amount of carryback transferred by the belt in units of at least mass based at least partially upon the duration of time and a perceived volume of the carryback material in the carryback receptacle. Still further, the method comprises modifying the bulk material conveyor system based upon the estimated amount of carryback transferred by the belt.

Further features and advantages of the present invention, as well as the operation of various embodiments of the present invention, are described in detail below with reference to the accompanying drawings.

BRIEF DESCRIPTION OF THE DRAWINGS

FIG. 5 is a perspective view of the lifting mechanism of the preferred embodiment of the carryback sampling device.

FIG. 6 is a perspective view of the carryback sampling container holder of the preferred embodiment of the carryback sampling device.

FIG. 7 is another perspective view of the carryback sampling container holder of the preferred embodiment of the carryback sampling device.

FIG. 9 is a perspective view of the carryback sampling container of the preferred embodiment of the carryback sampling device and is shown with its lid on.

Figure 1:
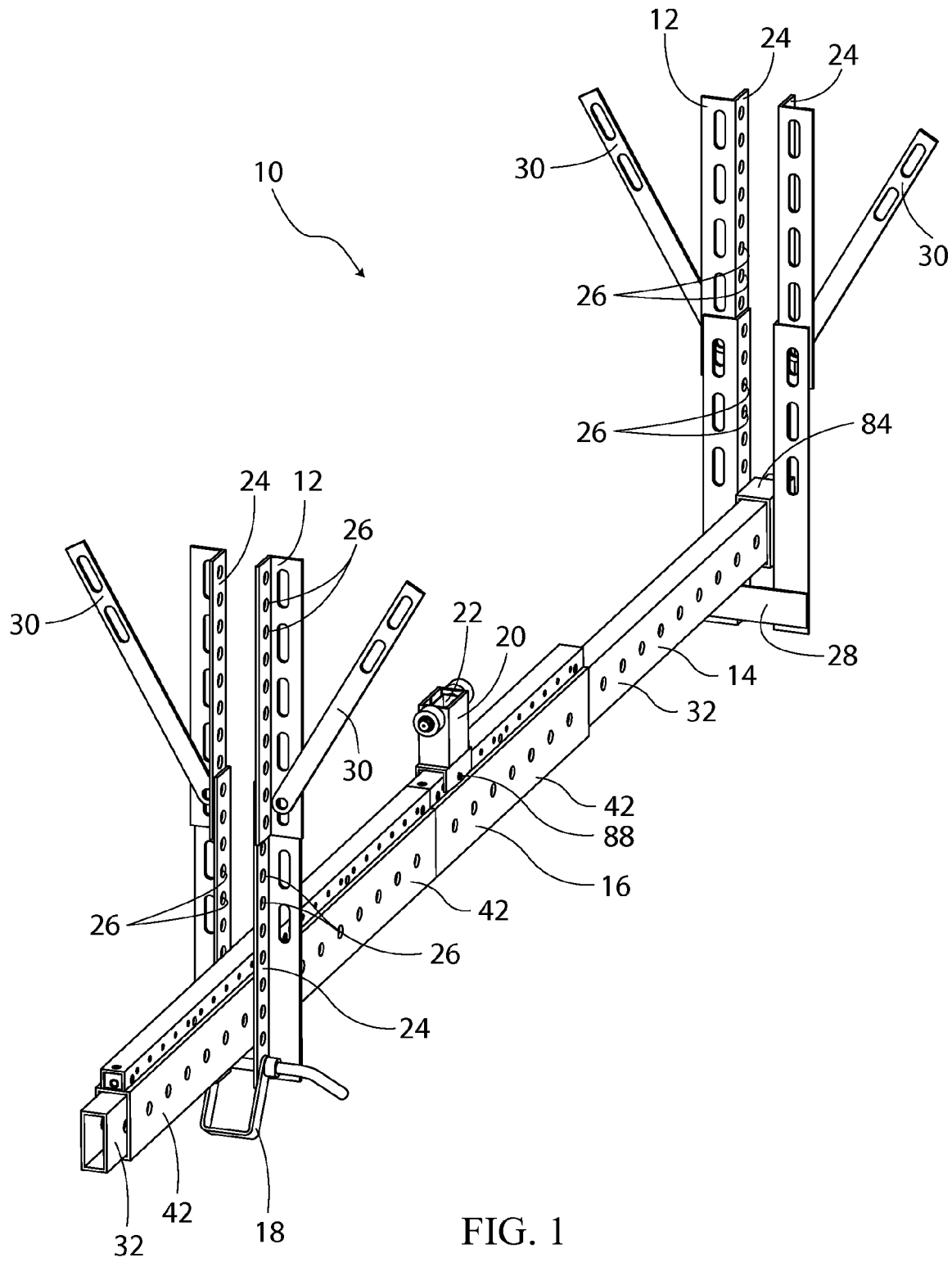
FIG. 1 is a perspective view of the preferred embodiment of a carryback sampling device in accordance with the invention and is shown with the carryback scraper in its lowered position.

Reference numerals in the written specification and in the drawing figures indicate corresponding items.

DETAILED DESCRIPTION OF THE PREFERRED EMBODIMENT

Figure 2:
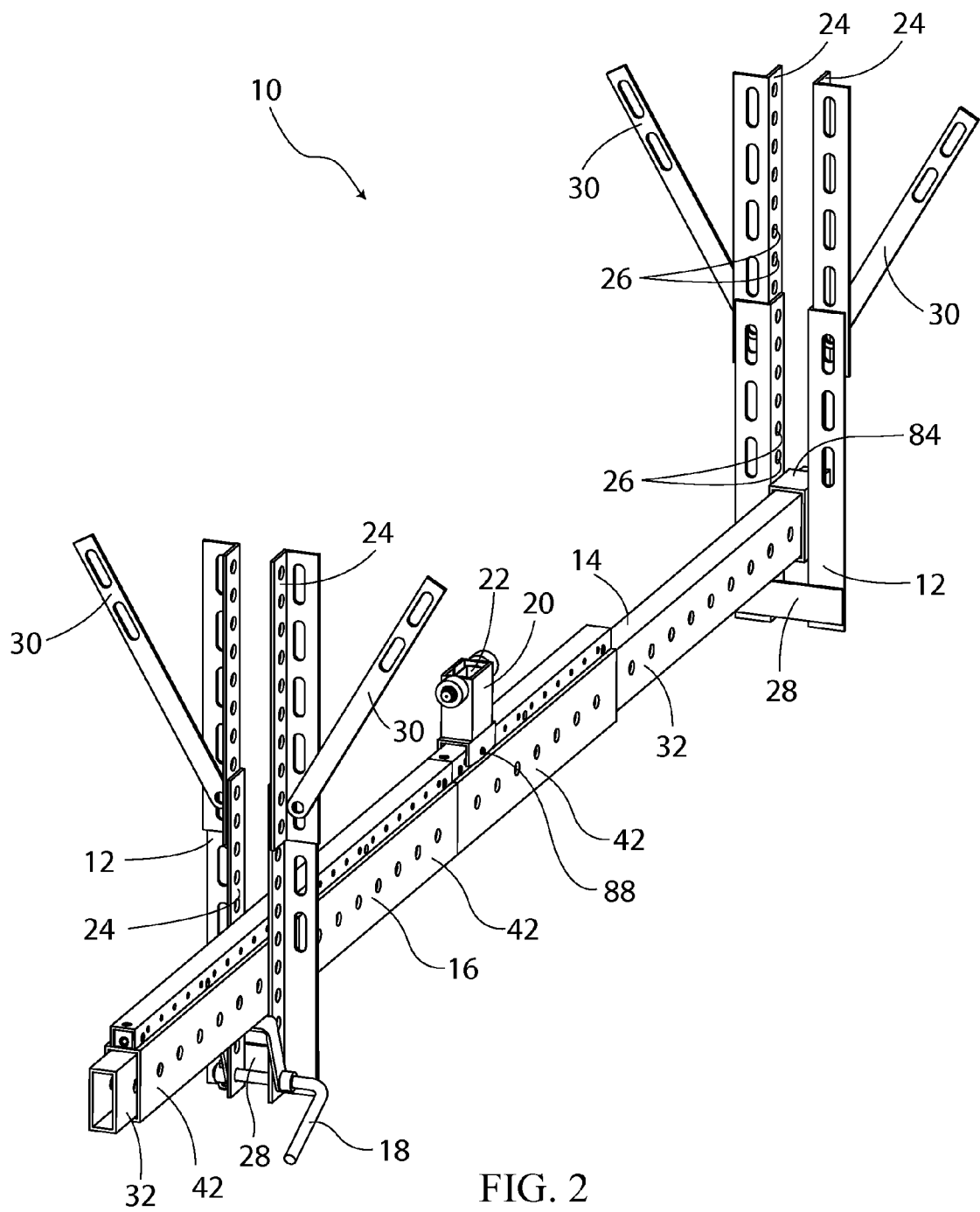
FIG. 2 is a perspective view of the carryback sampling device of FIG. 1 and is shown with the carryback scraper in its raised position.

A preferred embodiment of carryback sampling device 10 is shown in FIGS. 1 and 2. The carryback sampling device 10 preferably comprises primarily a pair of brackets 12, a mandrel 14, a sleeve 16, a lifting mechanism 18, a carryback sampling container holder 20, and a carryback sampling container 22.

The brackets 12 of the carryback sampling device 10 are preferably formed of welded steel pieces and are preferably identical to each other. Each bracket 12 preferably comprises a pair of spaced apart opposing vertical rails 24. Each rail preferably comprises a plurality of apertures 26. The rails 24 of each bracket 12 are preferably connected via a base plate 28. Each bracket 12 also preferably comprises a pair of diagonal stiffeners 30, which diverge apart as they extend upward from midway up the bracket.

Figure 3:
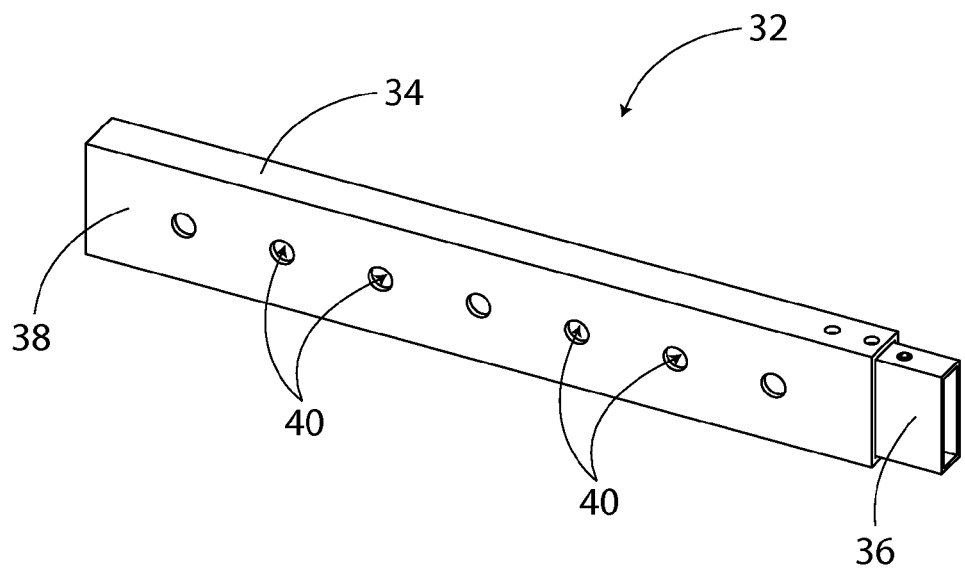
FIG. 3 is a perspective view of one of the modular mandrel sections of the preferred embodiment of the carryback sampling device.

The mandrel 14 serves as a support member for the carryback sampling container 22 and is preferably formed of a plurality of modular mandrel sections 32 (shown isolated in FIG. 3). Each modular mandrel section 32 is primarily a length of rectangular tubing 34 having an end fitting 36 extending from a first one of its longitudinal ends. The second end 38 of each modular mandrel section 32 is adapted and configured to receive the end fitting 36 of another modular mandrel section 34 in a semi-locking manner via one or more detent mechanisms provided on the end fitting. A plurality of longitudinally spaced apertures 40 extend transversely through the rectangular tube 34 portion of each modular mandrel section 32.

Figure 4:
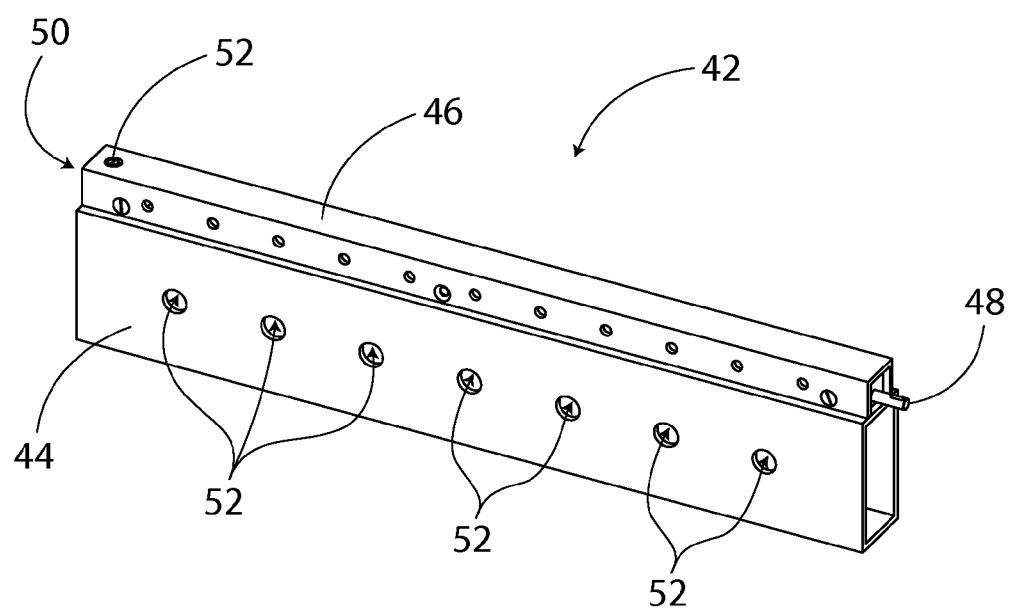
FIG. 4 is a perspective view of one of the modular sleeve sections of the preferred embodiment of the carryback sampling device.
Figure 8:
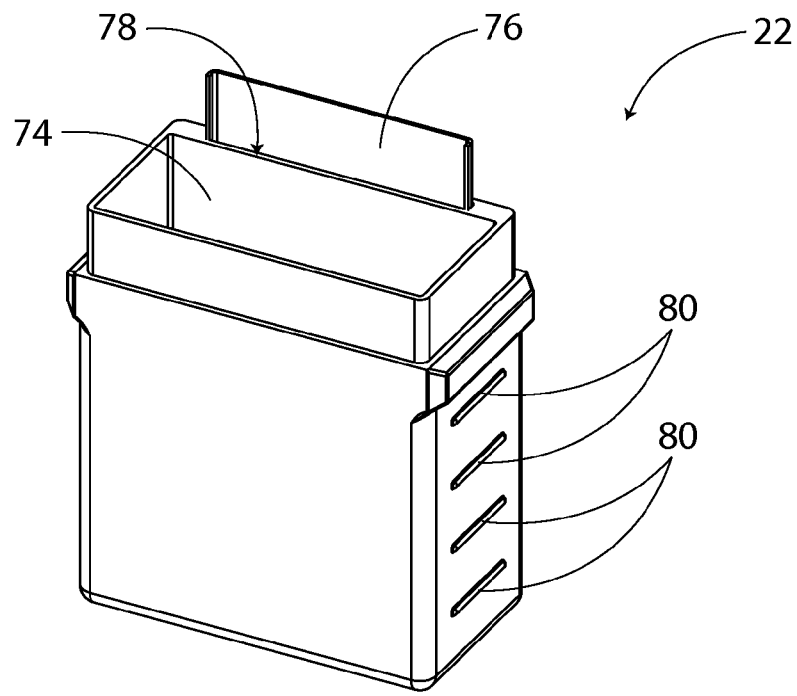
FIG. 8 is a perspective view of the carryback sampling container and carryback scraper of the preferred embodiment of the carryback sampling device.
Figure 9:
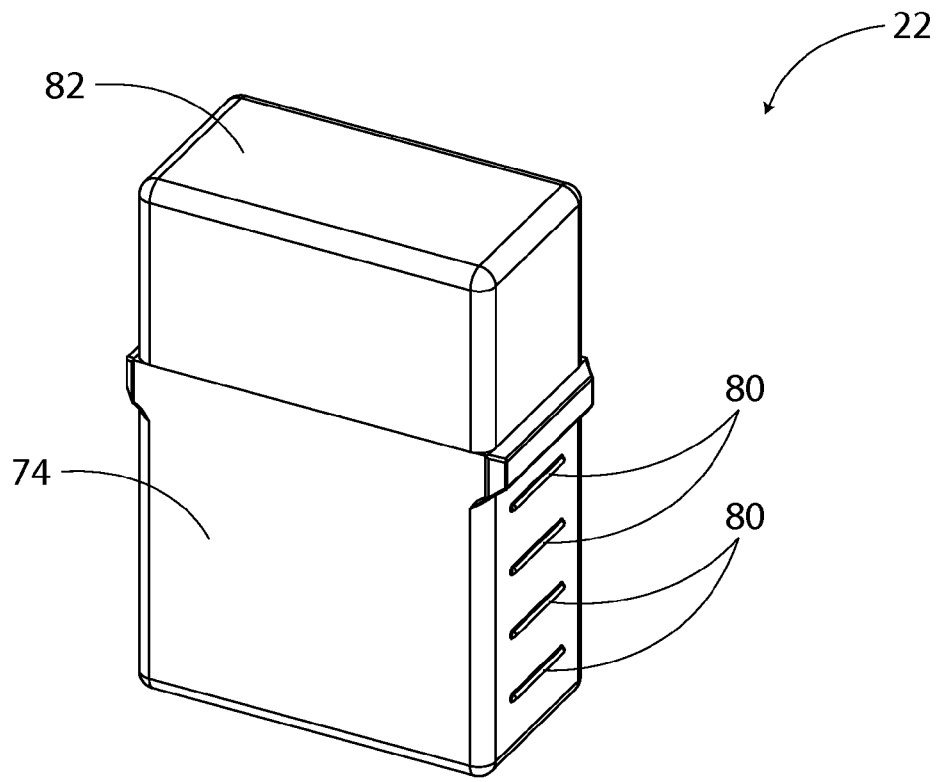

The sleeve 16 also serves as a support member for the carryback sampling container 22 and is preferably formed of a plurality of modular sleeve sections 42 (shown isolated in FIG. 4). Each modular sleeve section 42 comprises a rectangular tube 44, a rail 46, a male fitting 48, and a female fitting 50. The rail 46 is attached to the top of the rectangular tube 44 and preferably has a square shaped cross-section. The rail 46 preferably extends along the entire longitudinal length of the rectangular tube 44. The male fitting of each modular sleeve section 42 is secured to the rail and is adapted and configured to cooperate with the female fitting 50 that is secured to the rail of another modular sleeve section and to be secured thereto via a set screw 52 provided on the female fitting. The interior of the rectangular tube 44 is preferably unobstructed and dimensioned to slideably receive the mandrel 14 therethrough with little sliding clearance. Like with the modular mandrel sections 32, a plurality of longitudinally spaced apertures 54 extend transversely through the rectangular tube 44 of each modular sleeve section 42.

The lifting mechanism 18 of the carryback sampling device 10 preferably comprises an L-shaped rod 56 pivotally mounted to a C-shaped member 58. A quick-release pin allows the L-shaped rod 56 to selectively be removed from the C-shaped member 58. The C-shaped member 58 is preferably dimensioned such that the pair of rails 24 of one of the brackets 12 fits between the C-shaped member's opposite legs 60. The diameter of the L-shaped rod 56 is preferably configured to snugly pass through the apertures of the rails 24 of the brackets 12.

The carryback sampling container holder 20 of the carryback sampling device 10 is shown in FIGS. 6 and 7 and comprises main body 62, a pair of wheels 64, and a pair of coil compression springs 66. A recess 68 extends downward into the main body 62 from the top of the main body. The compression springs 66 are positioned at the bottom of the recess 68. The wheels 64 are rotationally mounted adjacent the top of the main body 62 have a common axis of rotation. The wheels 64 also protrude slightly above the top of the main body 62. A channel 70 is formed upward into the bottom of the main body 62 and extends parallel to the rotation axis of the wheels 64. An aperture 72 extends horizontally through the main body 62 and the channel 70 and perpendicular to the rotation axis of the wheels 64. The recess 68 of the carryback sampling container holder 20 is dimensioned to at least partially receive the carryback sampling container 22. The channel 70 of the carryback sampling container holder 20 is configured to receive the rail 46 of one of the modular sleeve sections 42 of the sleeve 16.

The carryback sampling container 22 is preferably approximately the size of a pack of cigarettes and comprises a container portion 74 and a carryback scraper 76. The container portion 74 preferably forms a cup that opens upward and is preferably formed of plastic. The container portion 74 serves as a receptacle for carryback material and preferably is at least semi-transparent. The carryback scraper 76 is preferably steel and is preferably press fit into a recess 78 formed in the rear wall of the container portion 74. A plurality of vertically spaced horizontal protrusion, recesses, or markings 80 preferably mark the exterior of the container portion 74. The carryback sampling container 22 also preferably comprises a cap 82 that is adapted and configured to close the top of container portion 74 while also covering the carryback scraper 76.

Figure 10:
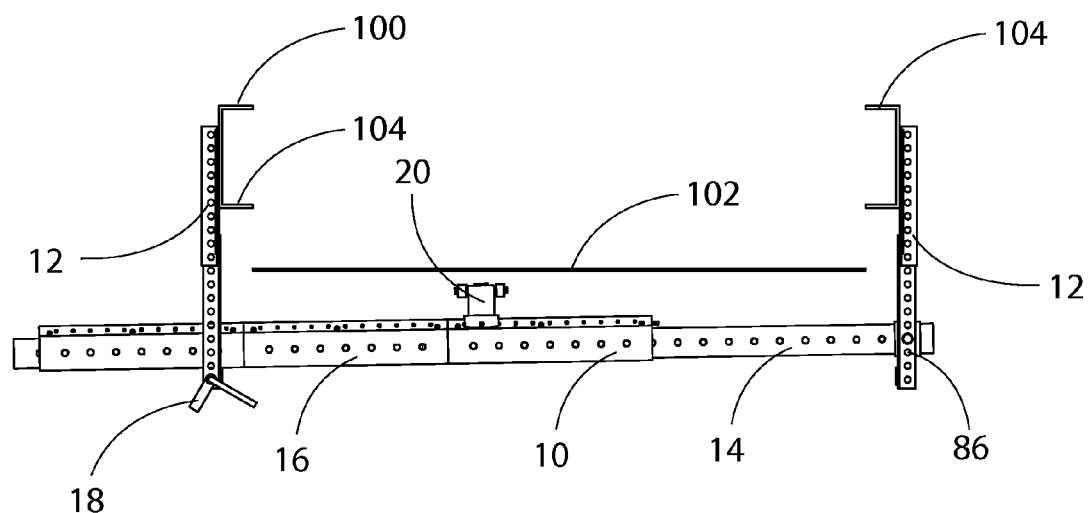
FIG. 10 is an elevation view of the carryback sampling device of the preferred embodiment attach to a belt conveyor system, and is shown with the carryback scraper in its lowered position.
Figure 11:
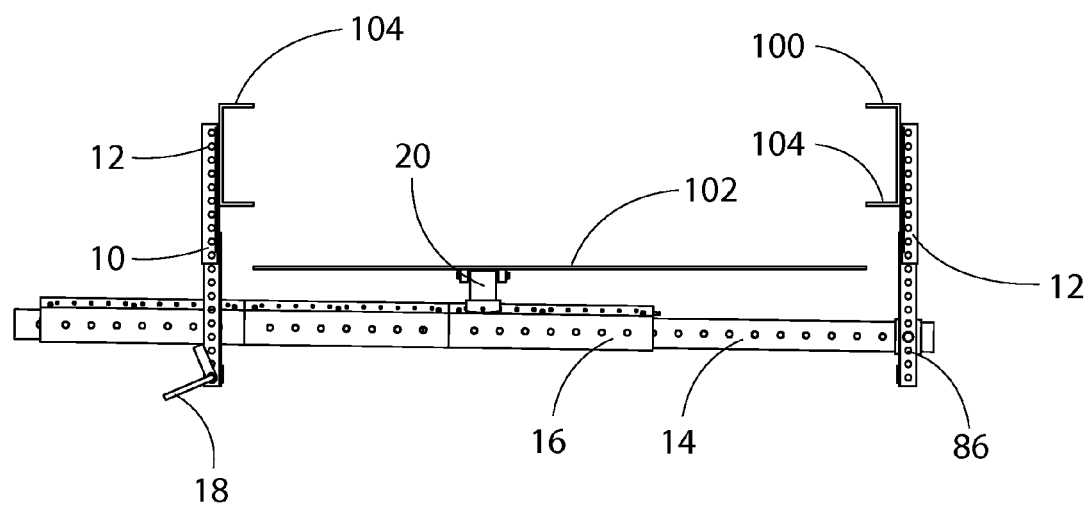
FIG. 11 is an elevation view similar to FIG. 10, but is shown with the carryback scraper in its raised position.

FIGS. 10 and 11 show an elevation view of the carryback sampling device 10 attached to a bulk transfer conveyor belt system 100, as viewed in a direction parallel to the direction of belt travel. The returning portion of the belt 102 and channels of the supporting frame 104 of the conveyor belt system 100 are shown. The carryback sampling device 10 can be assembled to the conveyor belt system 100 while the conveyor belt is operating. To do this, the brackets 12 are clamped, bolted, welded, or otherwise fastened to the channels of the of the supporting frame 104 of the conveyor belt system 100 in manner such that they lower than the belt 102 and such that they are aligned with each other on opposite sides of the belt. The mandrel 14 is assembled from a plurality of the modular mandrel sections 32 in a manner such that the length of the mandrel is greater than the distance between the brackets 12. The mandrel 14 is then positioned beneath the belt 102 by inserting the mandrel between the rails 24 of one of the brackets from a first side 106 of the conveyor system 100 until the mandrel also extends between the rails of the other bracket on the opposite second side 108 of the conveyor system. Initially, the mandrel 14 can be rested on the base plates 28 of the brackets 12. A spacer 84 in the form of a short length of rectangular tubing that has a an aperture extending therethrough and that is dimensioned to slideably receive the mandrel 14 and to fit between the rails 24 of one of the brackets 12 is then preferably slid over one end of the mandrel and between the rails of the respective bracket. The aperture of the spacer 84 is then preferably aligned with one of the apertures 40 of the mandrel 14 and with an aperture 26 of each of the rails 24 of the bracket 12 and a bolt or pin 86 is inserted through all of said apertures to thereby pivotally connect the mandrel to the bracket. The lifting mechanism 18 is assembled to the bracket 12 opposite the pinned side of the mandrel 14 by positioning the C-shaped member 58 of the lifting mechanism such that the legs 60 of the C-shaped member straddle the rails 24 of the bracket and thereafter securing the C-shaped member to the rails via the L-shaped rod 56 using the apertures 26 of the rails.

The sleeve 16 is assembled from a plurality of the modular sleeve sections 42 and needs not be as long as the mandrel 14. This can be performed in a convenient and safe work space while the belt is put back into operation. The carryback sampling container holder 20 is assembled to the sleeve 16 by positioning the rail 46 of one of the modular sleeve sections 42 in the channel 70 of the carryback sampling container holder, aligning the aperture 72 of the carryback sampling container holder with one of the apertures 54 of the rail, and thereafter passing a bolt or pin 88 through such apertures. The carryback sampling container 22 is then placed partially into the recess 78 of the carryback sampling container holder 20 and against the compression springs 66 of the carryback sampling container holder. The sleeve 16 then telescopically receives the non-pinned end of the mandrel 14 and is slid between the rails of the bracket 12 on the first side 106 of the belt 102, and along the mandrel until the carryback sampling container holder 22 is positioned at a desired location beneath the belt 102 for sampling carryback material. This can be performed while the conveyor is in operation.

After performing the above mentioned assembly steps, a sample of carryback material can be removed from the belt 102 of the conveyor belt system 100 using the carryback sampling device 10. This is done by simply manually pivoting the L-shaped rod 56 of the lifting mechanism 18 in a manner raising the C-shaped member 58 of the lifting mechanism. As the C-shaped member 58 of the lifting mechanism 18 raises, it engages the sleeve 16 and thereby pivots the sleeve 16 and the mandrel 14 about the pinned end of the mandrel. Because the legs 60 of the C-shaped member 58 of the lifting mechanism 18 straddle the rails 24 of the bracket 12, pivotal movement of the lifting mechanism, and therefore the mandrel 14, is limited such that the mandrel is raised only to a specific and repeatable maximum position relative to the belt. In this raised position, The wheels 64 of the carryback sampling container holder 20 engage the belt 102 and rotate with the belt. The wheels 64 ensure that the belt is positioned a specific distance above the top of the main body of 62 of the carryback sampling container 22. It should be appreciated that the pinned connection between the carryback sampling container holder 20 and the sleeve 16 allows the carryback sampling container holder to pivot slightly about an axis parallel to the direction of belt travel such that the axis of the wheels 64 will always be parallel to the surface of the belt 102. The carryback scraper 76 also engages the belt 102 in the raised positioned and is biased thereagainst by the compression springs 66 in the container portion 74 of the carryback sampling container holder 20. The compression springs 66 ensure that the carryback scraper 76 puts uniform pressure on the belt 102 and eliminates the need to align the carryback scraper relative to wheels 64 or top of the main body 62 of the carryback sampling container holder 20.

The raising of the above-mentioned components occurs quickly and the person operating the carryback sampling device 10 preferably begins tracking the amount of time in which the various components are held in the raised position. It should be appreciated that in this raised position, the carryback scraper 76 scrapes carryback material from the belt 102, which is deposited by gravity into the container portion 74 of the carryback sampling container 22. When a particular amount of time passes or when it is determined that a sufficient amount of carryback material has been deposited in the container portion 74 of the carryback sampling container 22, the lifting mechanism 18 is released, which allows the various components return to their lowered positions via gravity, thereby disengaging the carryback scraper 76 from the belt 102. With the various components in their lowered position and the conveyor still in operation, the carryback sampling container 22 can be removed from the carryback sampling device 10 by simply sliding the sleeve 16 along the mandrel 14 until the carryback sampling container 22 is positioned to the first side 106 of the belt 102 where it is no longer beneath the belt. The carryback sampling container 22 can then be lifted from the carryback sampling container holder 20 without the moving belt 102 creating a risk for the operator.

The carryback material deposited into the container portion 74 of the carryback sampling container 22 can be used to estimate the average amount of carryback material being transferred by the belt 102 of the conveyor system 100. This can be done using the prior art drying and weighing techniques discussed in the background above. However, the present invention also involves novel methods of making the estimation. More specifically, one such method utilizes the volume of the carryback material in the container portion 74 of the carryback sampling container 22 to estimate the mass of carryback material transferred by the belt 102 over a given time (typically per unit of time). The volume of carryback material in the container portion 74 of the carryback sampling container 22 can be estimated using the markings 80 provided on the carryback sampling container 22. This is facilitated by the transparency of the container portion 74. The markings 80 preferably correspond to incremental volume levels within the container portion 74, thereby making a fairly accurate estimate of volume of carryback material possible by visual inspection alone. Using this volume estimation, the speed of the belt, an estimate of the specific gravity or the density of the bulk carryback material, and estimate of the moisture content of the carryback material, the operator can use a particular pre-prepared lookup-chart to obtain an estimate of the mass of carryback material per a given time that is being transferred by the belt, the mass of carryback material per given area of the belt, or some other estimation of the mass of carryback material transferred by the belt as a function of area, time, or some combination thereof. Thus, assuming an operator has obtained an estimate of the specific gravity or density of the bulk carryback material, the moisture content of the carryback material, and the belt speed, the operator needs not make any calculations to come up with the additional estimations that are based on the sampling. An alternative method of making the estimations can comprise a step of measuring the weight of the carryback material, either dried or undried. This can be done by either directly measuring only the carryback material or by measuring the carryback sampling container 22 with carryback material therein and then subtracting a predetermined mass or weight therefrom to account for the mass or weight of the carryback sampling container 22. This estimation of the weight or mass of the carryback material can be used in lieu of the estimation of the carryback material's volume. With this method, lookup-charts are preferably utilized to identify an estimation of the mass of carryback material transferred by the belt as a function of area, time, or some combination thereof based upon the weight or mass of the carryback material and the speed of the belt. Thus, no mathematical calculations are required.

Whenever desired, any number of additional samplings of carryback material can be made by simply placing a new carryback sampling container 22 into the carryback sampling container holder 20 and repeating the process of using the carryback sampling device 10. This can be done without shutting down the conveyor system. The compression springs 66 of the carryback sampling container holder 20 ensure that each new carryback scraper 76 exerts approximately the same pressure on the belt 102 during each sampling run, regardless of slight dimensional differences between the carryback sampling containers 22 and without requiring the operator to carefully align any of the carryback sampling containers 22 with any other components of the carryback sampling device 10.

The cap 82 of the carryback sampling container 22 can be placed over the top of the container portion 74 and the carryback scraper 76 in a manner allowing the carryback sampling container 22 to be ship or stored without risk of spillage. The transparency of the container portion 74 allows for the visual comparison of the amount of carryback material contained in multiple carryback sampling containers 22. The carryback sampling container 22 can preferably be written on so as to serve as to allow the carryback sampling container 22 to serve as a record of a particular sampling event. The sealed carryback sampling container could potentially serve as visual evidence of the performance of the belt cleaning systems installed on the conveyor system and as a marketing tool for promoting proper maintenance of conveyor belt systems.

In view of the forgoing, it should be appreciated that the present invention allows carryback material to be sampled at will in various locations on the belt without shutting off the conveyor belt since an operator needs not place his or her hand beneath the moving belt to perform the sampling. It should also be appreciate that the modular nature of the mandrel and sleeve allow the carryback sampling device of the present invention to accommodate a variety of belt widths by simply using more or less of the modular mandrel sections and modular sleeve sections. Still further, it should be appreciated that an external power source or internal power storage is not required to required to practice the invention. Additionally, it should be appreciated that, multiple carryback sampling container holders and carryback sampling containers could be simultaneously attached to the carryback sampling device to obtain multiple carryback samples simultaneously at different positions along the width of the belt of a belt conveyor system. Furthermore, it should be appreciated that a quick-release pin or a bolt (not shown) could be placed in one of the apertures 40 of one of the modular mandrel sections 32 and be used as a stop for the sleeve 16 in a manner such that multiple samples could be taken from precisely the same spot along the width of the belt. Still further, it should be appreciated that the carryback sampling container of the carryback sampling device can simply be flipped around 180 degrees to sample carryback material with the belt operating in the reverse direction. This makes the carryback sampling device of the present invention well suited for sampling carryback material on directional or reversing belts.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A method of sampling carryback material transferred by a bulk material belt conveyor system, the belt conveyor system comprising a belt, a structural frame, and a carryback sampling device, the belt being supported by the structural frame and a having a downwardly facing portion having carryback material attached thereto, the carryback sampling device comprising at least a first bracket, first and second support members, a carryback receptacle, and a carryback scraper, the first support member being pivotally attached to the first bracket in a manner such that first support member is pivotally movable relative to and beneath the downwardly facing portion of the belt, the second support member being slideably attached to the first support member, the method comprising:

attaching the carryback receptacle to the second support member of the carryback sampling device while the belt is in motion relative to the structural frame;

moving the second support member relative to the first support member in a manner positioning the carryback receptacle under the downwardly facing portion of the belt while the belt is in motion relative to the structural frame;

pivotally moving the first and second support members relative to the first bracket while the belt is in motion relative to the structural frame into a position that causes the carryback scraper to scrape the belt and to transfer a portion of the carryback material to the carryback receptacle;

removing the carryback receptacle together with the portion of the carryback material from beneath the belt while the belt is in motion relative to the structural frame by sliding the second support member relative to the first support member.

2. A method in accordance with claim 1 wherein the carryback sampling device comprises at least a second bracket and a lifting mechanism, the second bracket is attached to the structural frame of the belt conveyor system, the lifting mechanism is movably connected to the second bracket, and the step of pivotally moving the first and second support members relative to the first bracket is achieved by manually moving the lifting mechanism relative to the second bracket.

3. A method in accordance with claim 1 wherein the carryback scraper is attached to carryback receptacle, and the step of attaching the carryback receptacle to the second support member of the carryback sampling device also attaches the carryback scraper to the second support member.

4. A method in accordance with claim 1 wherein the carryback sampling device comprises a coil spring, and the carryback scraper is biased by the spring against the belt when the first and second support members are in the position that causes the carryback scraper to scrape the belt.

5. A method in accordance with claim 1 wherein the steps of moving the second support member relative to the first support member and pivotally moving the first and second support members relative to the first bracket utilizes only human power.

6. A method in accordance with claim 1 wherein the belt traverses in a first direction relative to the structural frame during the step of pivotally moving the first and second support members relative to the first bracket and wherein the step of pivotally moving the first and second support members relative to the first bracket comprises pivotally moving the first and second support members about an axis that is parallel to the first direction.

7. An assembly comprising a bulk material belt conveyor system and a carryback sampling device, the bulk material belt conveyor system comprising a belt and a structural frame, the belt being supported by the structural frame and having a downwardly facing portion, the downwardly facing portion of the belt being configured to traverse in a first direction relative to the structural frame, the carryback sampling device comprising at least a first support member, a carryback receptacle and a car back scraper the first support member being pivotally attached to the structural frame about an axis that is parallel to the first direction, the carryback scraper and the carryback receptacle being attached to the structural frame via the first support member in a manner such that pivotal movement of the first support member about the axis relative to the structural frame brings the carryback scraper into engagement with the downwardly facing portion of the belt with the carryback receptacle positioned therebeneath.

8. An assembly comprising a bulk material belt conveyor system and a carryback sampling device, the bulk material belt conveyor system comprising a belt and a structural frame, the belt being supported by the structural frame and having a downwardly facing portion, the downwardly facing portion of the belt being configured to traverse in a first direction relative to the structural frame, the carryback sampling device comprising at least a first support member, a carryback receptacle, and a carryback scraper, the first support member comprising a plurality of substantial identical sections that are attached to each other, the first support member being pivotally attached to the structural frame about an axis, the carryback scraper and the carryback receptacle being attached to the structural frame via the first support member in a manner such that pivotal movement of the first support member about the axis relative to the structural frame brings the carryback scraper into engagement with the downwardly facing portion of the belt with the carryback receptacle positioned therebeneath.

9. An assembly comprising a bulk material belt conveyor system and a carryback sampling device, the bulk material belt conveyor system comprising a belt and a structural frame, the belt being supported by the structural frame having a downwardly facing portion, the downwardly facing portion of the belt being configured to traverse in a first direction relative to the structural frame, the a carryback sampling device comprising at least a first support member and a second support member, a carryback receptacle, and a carryback scraper, the first support member being pivotally attached to the structural frame about an axis, the second support member being attached to the first support member in a manner such that the second support member can slide linearly relative to the first support member and such that the second support member pivotally moves about the axis together with the first support member, the carryback scraper and the carryback receptacle being attached to the structural frame via the first support member in a manner such that pivotal movement of the first support member about the axis relative to the structural frame brings the carryback scraper into engagement with the downwardly facing portion of the belt with the carryback receptacle positioned therebeneath, and the carryback receptacle is connected to the first support member by the second support member.

10. An assembly in accordance with claim 9 wherein the scraper blade is attached to the first support member by the second support member.

11. An assembly comprising a bulk material belt conveyor system and a carryback sampling device, the bulk material belt conveyor system comprising a belt and a structural frame, the belt being supported by the structural frame and having a downwardly facing portion, the downwardly facing portion of the belt being configured to traverse in a first direction relative to the structural frame, the carryback sampling device comprising at least a first support member, a carryback receptacle, a carryback scraper, and a lifting mechanism, the first support member being pivotally attached to the structural frame about an axis, the carryback scraper and the carryback receptacle being attached to the structural frame via the first support member in a manner such that pivotal movement of the first support member about the axis relative to the structural frame brings the carryback scraper into engagement with the downwardly facing portion of the belt with the carryback receptacle positioned therebeneath, the lifting mechanism being movably connected to both the structural frame of the belt conveyor system and to the first support member in a manner such that movement of the lifting mechanism relative to the belt conveyor system and to the first support member causes the first support member to pivot about the axis relative to the structural frame.

12. An assembly in accordance with claim 11 wherein the lifting mechanism is pivotally moveable relative to the structural frame.

13. An assembly comprising a bulk material belt conveyor system and a carryback sampling device, the bulk material belt conveyor system comprising a belt and a structural frame, the belt being supported by the structural frame and having a downwardly facing portion, the downwardly facing portion of the belt being configured to traverse in a first direction relative to the structural frame, the carryback sampling device comprising at least a first support member, a carryback receptacle, a carryback scraper, and a coil spring, the coil spring allowing the scraper to resiliently move relative to the first support member, the first support member being pivotally attached to the structural frame about an axis, the carryback scraper and the carryback receptacle being attached to the structural frame via the first support member in a manner such that pivotal movement of the first support member about the axis relative to the structural frame brings the carryback scraper into engagement with the downwardly facing portion of the belt with the carryback receptacle positioned therebeneath.

14. An assembly comprising a bulk material belt conveyor system and a carryback sampling device, the bulk material belt conveyor system comprising a belt and a structural frame, the belt being supported by the structural frame and having a downwardly facing portion, the downwardly facing portion of the belt being configured to traverse in a first direction relative to the structural frame, the carryback sampling device comprising at least a first support member, a carryback receptacle, and a carryback scraper, the first support member being pivotally attached to the structural frame about an axis, the carryback scraper and the carryback receptacle being attached to the structural frame via the first support member in a manner such that pivotal movement of the first support member about the axis relative to the structural frame brings the carryback scraper into engagement with the downwardly facing portion of the belt with the carryback receptacle positioned therebeneath, the assembly being devoid of any power source.

* * * * *